Feb. 26, 1952 J. D. ROBERTSON 2,587,224
WEFT-STRAIGHTENING APPARATUS
Filed Dec. 3, 1949 6 Sheets-Sheet 1
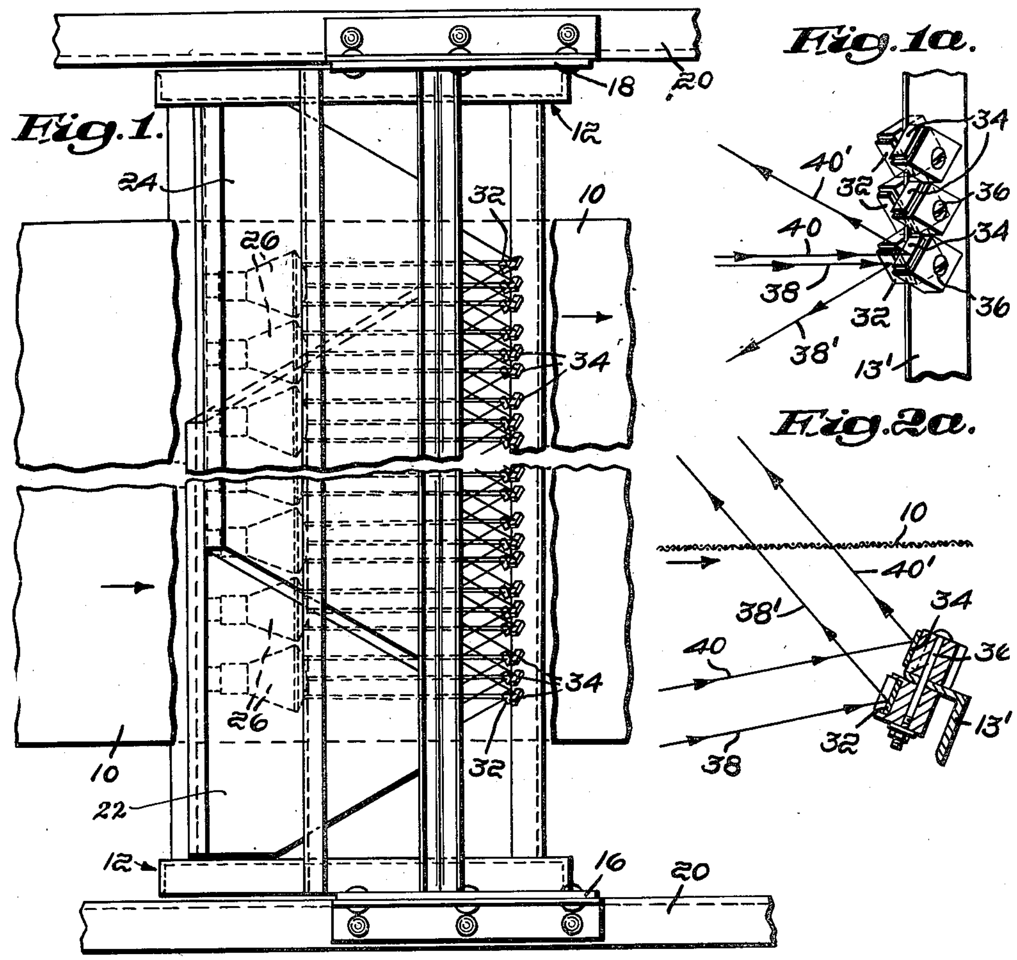
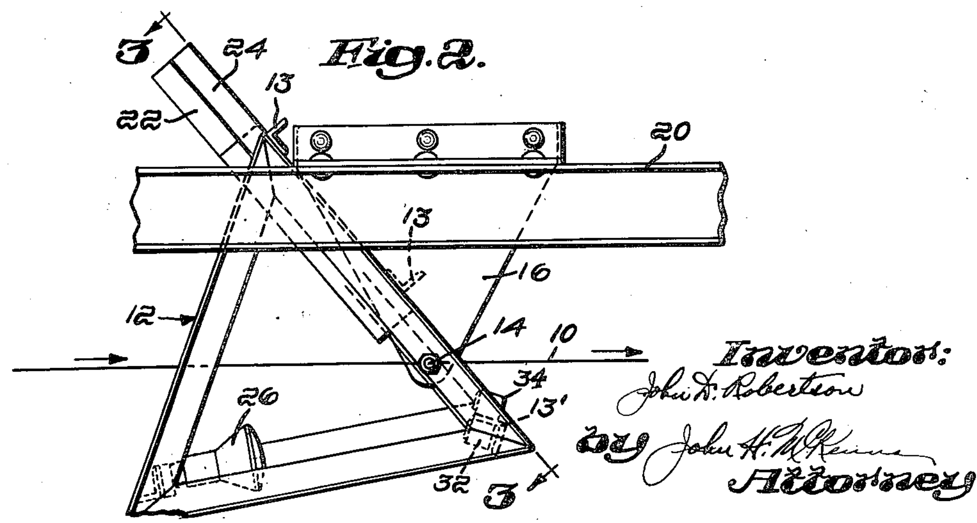
Inventor:
John D. Robertson
by John H. McKenna
Attorney Feb. 26, 1952 J. D. ROBERTSON 2,587,224
WEFT-STRAIGHTENING APPARATUS
Filed Dec. 3, 1949 6 Sheets-Sheet 2
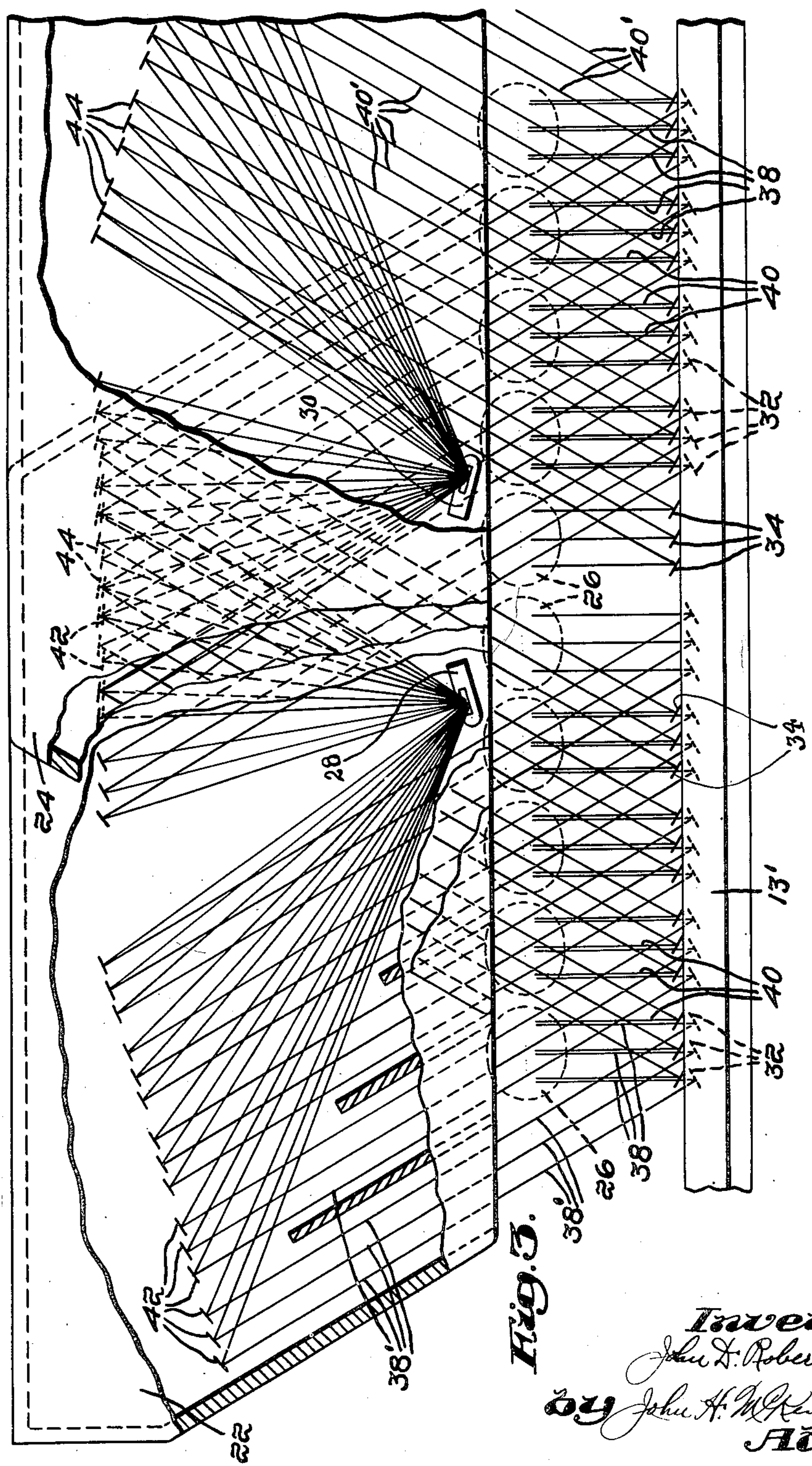
Inventor:
John D. Robertson
by John H. McKenna
Attorney Inventor:
John D. Robertson
by John H. McKenna
Attorney Inventor:
John D. Robertson
by John H. McKenna
Attorney

WEFT-STRAIGHTENING APPARATUS

Filed Dec. 3, 1949 6 Sheets-Sheet 5

Inventor:
John D. Robertson
by John H. McKenna
Attorney

Feb. 26, 1952 J. D. ROBERTSON 2,587,224

WEFT-STRAIGHTENING APPARATUS

Filed Dec. 3, 1949 6 Sheets-Sheet 6

Inventor:
John D. Robertson
by John H. McKenna
Attorney

Patented Feb. 26, 1952 2,587,224

UNITED STATES PATENT OFFICE 2,587,224

WEFT-STRAIGHTENING APPARATUS

John D. Robertson, Taunton, Mass.

Application December 3, 1949, Serial No. 130,892

9 Claims. (Cl. 26—51)

1

This invention relates to improvements in apparatus for detecting and correcting a skewed or bowed condition of the weft or filler threads in woven fabric webs and the like. More particularly it provides improved means for scanning a travelling woven web of cloth, or any other woven material having longitudinal threads, filaments or wires and having transverse threads, filaments or wires which are intended to be perpendicular thereto, the scanning means being adapted to detect any skew or bow of the transverse elements, and to effect automatically an operation of associated mechanism in a manner to correct the skewed or bowed condition of the transverse elements.

In the textile industry, for example, woven fabrics are subjected to various treatments after being woven. Initially the weft or filler threads are perpendicular to the warp. However, in the course of subsequent processing, the weft or filler threads frequently become skewed or bowed. They may assume a skewed arrangement in which their ends at one selvage may lead or lag behind their ends at the other selvage, or they may become bowed so that their central portions either lead or lag behind their ends at the two selvage regions. In either case, it becomes necessary or desirable to correct the skewed or bowed condition of the weft or filler threads. The correction may be accomplished by available weft straightening mechanism which may be manually operated following visual detection of skew or bow by the operator, but it is preferable to effect the correction automatically in response to automatic scanning and detecting means.

It has been proposed heretofore to effect automatic operation of weft straightening mechanism in response to light rays deflected in generally lateral directions by the threads of a travelling web of fabric or the like, the deflected rays being directed toward light sensitive tubes or the like, disposed adjacent to the opposite selvages of the travelling web, and adapted to initiate operation of weft straightening mechanism. According to the prior proposal, if the filler threads are skewed in one direction more light will be deflected to one light sensitive tube than to the other and the tube receiving the larger amount of deflected light will dominate and cause the proper correcting operation of the correcting mechanism. If the skew is in the opposite direction, the other light sensitive tube will receive more deflected light and will dominate and cause the proper correcting operation of the correcting mechanism. On the other hand, if the filler

2 threads are bowed in one direction or the other, the prior proposal requires four light sensitive tubes or cells, two adjacent to each edge of the travelling web, and each tube at one edge is electrically connected in parallel with the opposite tube at the other edge. These tubes scan different areas of the web and are intended to integrate the deflected light so as to detect a bowed condition of the transverse elements and initiate the proper correcting operation of mechanism for straightening the weft threads.

It is an object of my present invention to provide a more accurate and more sensitive light scanning means for automatic scanning of a travelling fabric web or the like, and for detecting and correcting either skew or bow of the filler threads, or other transverse elements of the web which is being scanned. According to my invention, light is directed through the travelling web in sheets of rays, each of which sheets of rays extends substantially throughout the entire width of the web, with the direction of the rays of one sheet crossing the direction of the rays of the other sheet, and with all of the rays substantially inclined longitudinally of the web. The light rays of one sheet of rays passing through the web are re-directed and converged upon one light sensitive tube, and the light rays of the other sheet of rays passing through the web are re-directed and converged upon another light sensitive tube, the tubes being connected in a well known manner for initiating operation of skew or bow correcting mechanism in one direction or the other, depending upon whether one or the other tube is the dominating one due to difference of light intensity thereon as compared with the light intensity on the other tube.

Another object of the invention is to provide for scanning and detecting skew or bow of the transverse elements relative to the longitudinal elements of a travelling woven web of sheet material by means of sheets of rays of light directed through the web with all of the rays passing through the web with a common angle of inclination longitudinally of the web and with all of the rays of one sheet of rays having a common angle of lateral inclination toward one edge of the web and with all of the rays of another sheet of rays having a similar common angle of lateral inclination toward the other edge of the web, the rays which have passed through the web in one sheet being converged on one light sensitive device, and the rays which have passed through the web in the other sheet being converged on a different light sensitive device, any substantial difference in light intensity on the two light sensitive devices being indicative of a displaced condition of the transverse elements of the web.

Yet another object of the invention is to provide for detecting skew or bow of the transverse elements of a travelling woven web by directing a plurality of parallel transverse sheets of rays of light through the web with a common angle of inclination longitudinally of the web, and with the rays of one sheet laterally inclined toward one edge of the web and the rays of another sheet laterally inclined toward the other edge, of the web, and detecting a displaced condition of the transverse elements of the web by any substantial difference in the intensity of light passing through the web in the two sheets of rays, the said angle of longitudinal inclination of the rays being adjustable to suit the nature of the woven web through which the rays of light are being directed.

A still further object is to detect skew or bow of the transverse elements of a travelling woven web by directing parallel sheets of rays of light in different angular directions through the web and utilizing the web as a shutter for reducing the number of rays passing through the web or a substantial portion thereof, in one angular direction when the transverse elements of the web are displaced out of their normal relation to the longitudinal elements thereof.

It is, moreover, my purpose and object generally to improve the structure and effectiveness of apparatus for scanning, detecting and correcting a skewed or bowed condition of the transverse elements relative to the longitudinal elements of a travelling woven web of sheet material, and especially such apparatus wherein light is the agent employed for the scanning and detecting functions.

In the accompanying drawings:

Fig. 1 is a top plan view of scanning and skew detecting apparatus embodying features of my invention, the central portions thereof being broken away to conserve space, and the rays of light directed through the web from the respective mirrors being diagrammatically represented by single lines;

Fig. 1*a* is a top plan view on a larger scale of a fragment of the supporting bar for the mirrors which direct rays of light through the web, one group of six mirrors being shown in perspective mounted on the bar;

Fig. 2 is an end elevation of the apparatus shown in Fig. 1;

Fig. 2*a* is a cross-sectional view through one of the mirror securing bolts of Fig. 1*a*;

Fig. 3 is a view approximately on line 3—3 of Fig. 2, on a larger scale, with wall portions of the rays receiving boxes broken away to show the converging of rays in the respective boxes;

Figure 4:
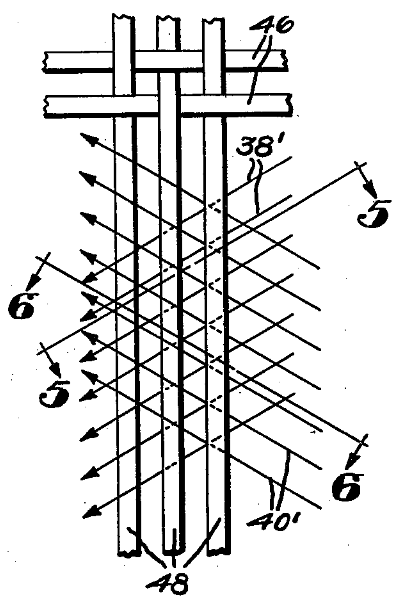
Fig. 4 is a magnified diagrammatic plan view of a portion of a woven web illustrating the passage of light rays therethrough when the transverse or weft elements are in proper perpendicular relation to the longitudinal or warp elements, only two longitudinal or warp elements being shown to avoid confusion.

Referring to the drawings, and more particularly to Figs. 1 and 2 thereof, a web of woven cloth, or the like, is indicated at 10, it having guided travel in the direction of the arrows, and passing between side sections 12 of a pivotally mounted frame which is pivoted at 14 to the fixed members 16, 18 which depend from generally horizontally extending supporting elements 20 at each side of the scanning and skew detecting apparatus. The pivoted frame conveniently may be constructed of angle iron, three lengths of angle iron being shown connected together in the form of a triangle at each side section 12, and the two side sections 12 being rigidly connected together by the angle iron bars 13 and 13′.

Two narrow and relatively deep boxes 22, 24 are rigidly supported on the pivoted frame, between the side sections 12 and above the web 10. The boxes are arranged in mutually overlapping side-by-side relation, as best seen in Fig. 1, and are inclined with respect to the plane of the web 10, as best seen in Fig. 2. The lower side or edge of each box is open.

Also mounted on the pivoted frame are a number of lamps 26, the number varying according to the maximum width of a web 10 which any particular scanning and detecting apparatus is designed to accommodate. The lamps 26 are arranged in slightly spaced relation in a transverse row below the web 10 with their axes in a common plane.

Rays of light from the lamps 26 are directed generally in the direction of travel of the web 10 but at a location substantially below the plane of the web. However, according to the invention, the light rays from the lamps are intercepted and re-directed in predetermined directions such that the re-directed rays which find openings between threads of web 10 pass through the web and into one or the other of the boxes 22, 24. Within each box the rays of light again are intercepted and re-directed, the rays coming into box 22 being re-directed so that all of the re-directed rays in box 22 converge at the light responsive tube 28 (Fig. 3) mounted in box 22, and the rays coming into box 24 being re-directed so that all of the re-directed rays in box 24 converge at the light responsive tube 30 (Fig. 3) mounted in box 24.

In the embodiment of the invention as herein illustrated in Figs. 1–11, a multiplicity of relatively small mirrors are employed for intercepting and re-directing the rays of light. Three such mirrors 32 are mounted as a set opposite each lamp 26 excepting one lamp near the center of the row of the transverse row of lamps; and three similar mirrors 34 are mounted as a second set opposite each lamp 26 excepting one lamp near the center of the transverse row. The mirrors are carried on rectangular blocks which are adjustably mounted on one of the angle iron bars 13'. Fig. 2*a* shows, in cross-section, a mirror 32 and a mirror 34 with their respective carrying blocks adjustably secured on opposite sides of a bar 13', so that the mirrors may be adjusted about the pivot bolt 36 of the blocks, and Fig. 1*a* is a plan view of Fig. 2*a*, showing a set of three of the mirrors 32 and a set of three of the mirrors 34, all of the mirrors of the two sets being grouped and adjusted for receiving and re-directing rays from a single lamp 26. In Fig. 2*a*, the line 38 indicates a ray of light from a lamp 26 striking a mirror 32, and the line 38' indicates the re-directing ray passing upwardly and rearwardly through the fabric 10 on its course leading into box 22, this re-directed ray 38' having inclination also in lateral direction toward the eye in Fig. 2*a*, as indicated in Fig. 1*a*, where the ray 38 from the lamp and the re-directed ray 38' from the mirror 32 are indicated in plan by the same reference characters.

In Fig. 2*a*, the line 40 indicates a ray of light from the same lamp 26 striking a mirror 34, and the line 40' indicates the re-directed ray passing upwardly and rearwardly through the fabric 10 on its course leading into the box 24, this re-directed ray 40' having inclination in lateral direction away from the eye in Fig. 2*a*, as indicated in Fig. 1*a*, where the ray 40 from the lamp and the re-directed ray 40' from the mirror 34 are indicated in plan by the same reference characters.

Inasmuch as the mirror supporting bar 13' and the lamps are relatively fixed on the pivoted frame, the angle between the line 38 and line 38', and between line 40 and 40', as seen in Fig. 2*a*, is fixed in all positions of the pivoted frame, but the inclinations of these lines to the horizontal plane of the fabric 10 may be varied by adjustment of the frame about its pivot 14.

The lateral inclination of lines 38' and 40', as viewed in Fig. 1*a*, may be varied by adjustment of the mirrors about the block bolts 36, it presently being considered desirable to set the mirrors to provide angles between lines 38 and 38' and between 40 and 40', as viewed in Fig. 1*a*, at about 32 degrees.

Fig. 3 illustrates the re-directed rays 38', 40' entering the respective boxes 22, 24, the rays 38' entering box 22 and striking the converging mirrors 42 therein which converge all of the rays 38' on the light sensitive tube 28, in box 22, while similar converging mirrors 44 in box 24 converge all of the rays 40' on the light responsive tube 30, in box 24.

Figure 7:
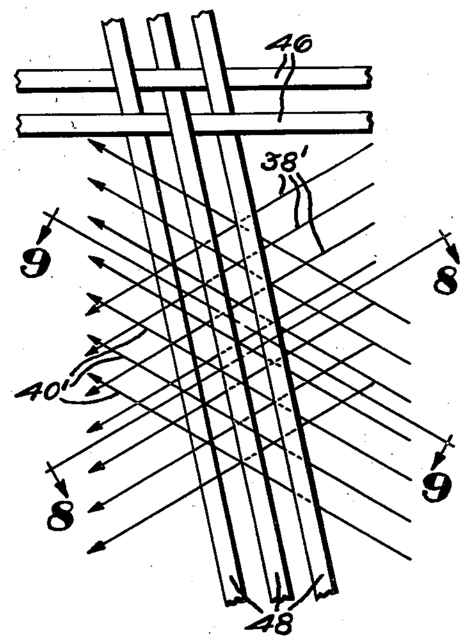
Fig. 7 is a view similar to Fig. 4 but showing the transverse or weft elements skewed with respect to the longitudinal or warp elements.
Figure 5:
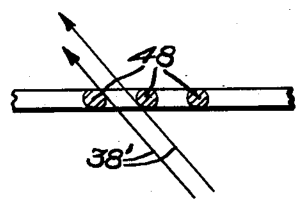
Fig 5 is a cross-sectional view on line 5—5 of Fig. 4.
Figure 6:
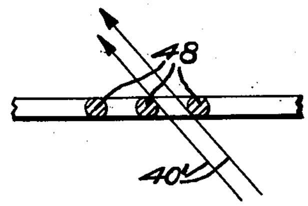
Fig. 6 is a cross-sectional view on line 6—6 of Fig. 4.

Referring now to the diagrammatic showings of Figs. 4–9, the longitudinal or warp elements of a woven web are indicated at 46, only two being shown, in Figs. 4 and 7, and the transverse or weft elements are indicated at 48. When the transverse elements are in proper perpendicular relation to the longitudinal elements, as in Fig. 4, approximately an equal number of the rays 38' and 40' will pass through the web. This is illustrated in Figs. 5 and 6 which are respectively cross-sectional views on lines 5—5 and 6—6 of Fig. 4, and which show equal width of space between adjacent transverse elements 48 for passage of rays 38' into box 22 and for passage of rays 40' into box 24. Hence, the intensity of light converged on the light sensitive tubes 28 and 30 will be approximately equal.

Figure 8:
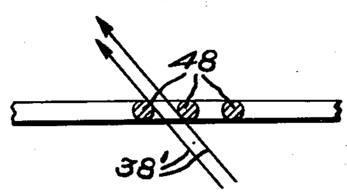
Fig. 8 is a cross-sectional view on line 8—8 of Fig. 7.
Figure 9:
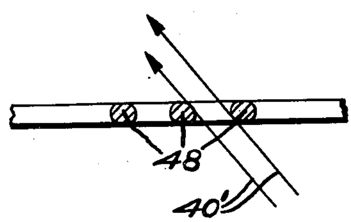
Fig. 9 is a cross-sectional view on line 9—9 of Fig. 7.

However, when the transverse elements 48 become skewed, as represented in Fig. 7, the web acts as a shutter reducing the effective size of the openings through which rays 38' can pass through the web while simultaneously increasing the effective size of the openings through which rays 40' can pass through the web. This is illustrated in Figs. 8 and 9 which respectively are cross-sections on lines 8—8 and 9—9 of Fig. 7. In Fig. 8 it will be obvious that the space between adjacent transverse elements 48 is appreciably reduced as compared with their spacing in Fig. 5, whereby a less number of the rays 38' can pass through the web into box 22. Fig. 9 shows how the space between the transverse elements 48 for passage of rays 40' is appreciably increased as compared with Fig. 6. Hence, an increased number of rays 40' can pass through the web into box 24, with the result that a substantially greater number of rays 40' will be converged on tube 30 as compared with the number of rays 38' that will be converged on tube 28. If the skew of the transverse elements is in the opposite direction from that shown in Fig. 7, a similar shutter effect will be obtained but, in such a case, the number of rays 40' passing through the web will be reduced and the number of rays 38' passing through the web will be increased, as compared with the equal-passage condition which prevails so long as the elements are in proper perpendicular relationships.

It will be obvious that the longitudinal elements which have been omitted in Figs. 4–9 would have approximately equal light-obstructing effect on both the rays 38' and the rays 40', so that the described shutter effect of a web having skewed transverse elements is attained when the longitudinal elements are present.

It is a feature of importance that the lamps 26, all of the mirrors 32, 34, 42, 44 and the tubes 28, 30, are mounted on the pivoted frame 12. Hence, having been properly set relative to each other, the frame 12 may be adjusted about its pivot 14 without disturbing their set relationships, such adjustment being desirable to vary the angle at which the rays of light pass through the web, as seen in Fig. 2*a*. If the web has a relatively open weave, the acute angle between the rays 38' and 40' and the plane of the web will be substantially less than when the web has a close weave. It may be desirable, for example, to vary this angle from around 20 degrees to around 55 degrees for different varieties of woven sheet materials.

Referring more particularly to Figs. 1 and 3, it will be observed that both sets of rays of light 38' and 40' pass through the web throughout substantially the entire width of the web, there being a relatively small marginal region along each edge which is not scanned, and a relatively small middle region (Fig. 3) which is not scanned. It is essential that each set of rays 38' and 40' scan, for the most part, the same longitudinal or warp elements. The central region which is not scanned is unimportant in the result because the warp elements at this region customarily are uniformly taut and any existing skew of the transverse elements in this region ordinarily will be the same as the average skew in the relatively much larger regions which are scanned. The unscanned edge regions are left to avoid any possibility of rays passing into the boxes 22, 24 without first passing through the web, such as when the web may shift a little laterally in either direction. Here again the relatively narrow unscanned marginal regions, as compared with the much larger widths of web which are scanned, have little or no effect on the accuracy of the scanning results for detecting any appreciable skew. Adjustable obstructions (not shown) may be mounted along each marginal region of the web for blocking off rays which otherwise would enter the boxes 22, 24, thereby to adjustably determine the width of web which will be scanned. The apparatus will be provided in suitable widths for effecting scanning the usual widths of fabric or other woven sheet materials, but the mentioned adjustable marginal obstructions may be employed to make any particular apparatus accomodate different widths of material.

Figure 10:
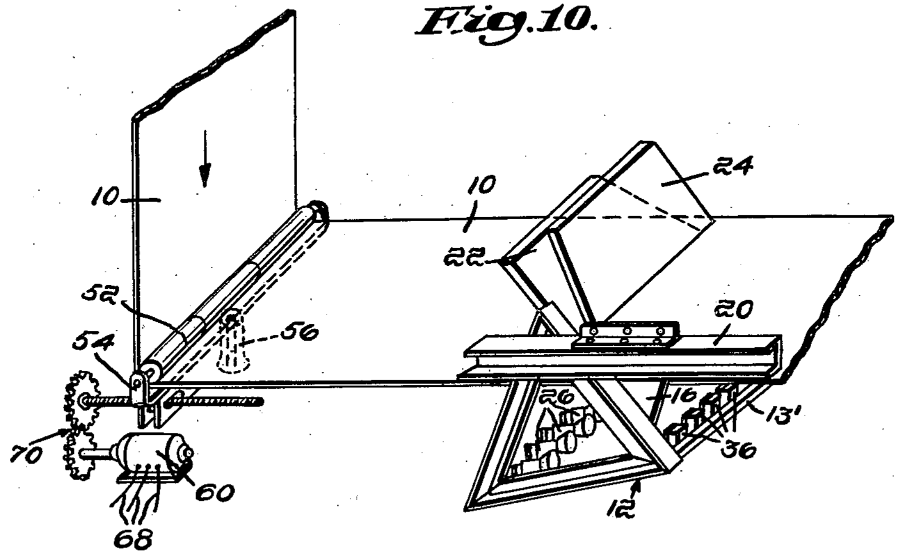
Fig. 10 is a diagrammatic perspective view illustrating the scanning and detecting apparatus of Figs. 1–3 associated with skew-correcting mechanism.
Figure 11:
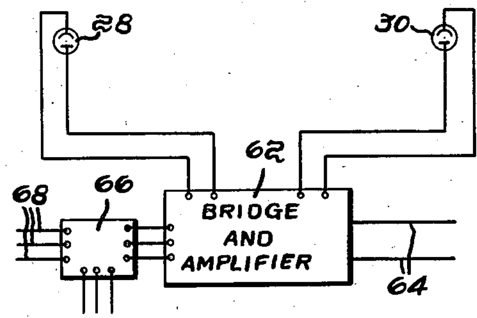
Fig. 11 is a wiring diagram of the electrical connections of the apparatus and mechanism of Fig. 10.
Figure 12:
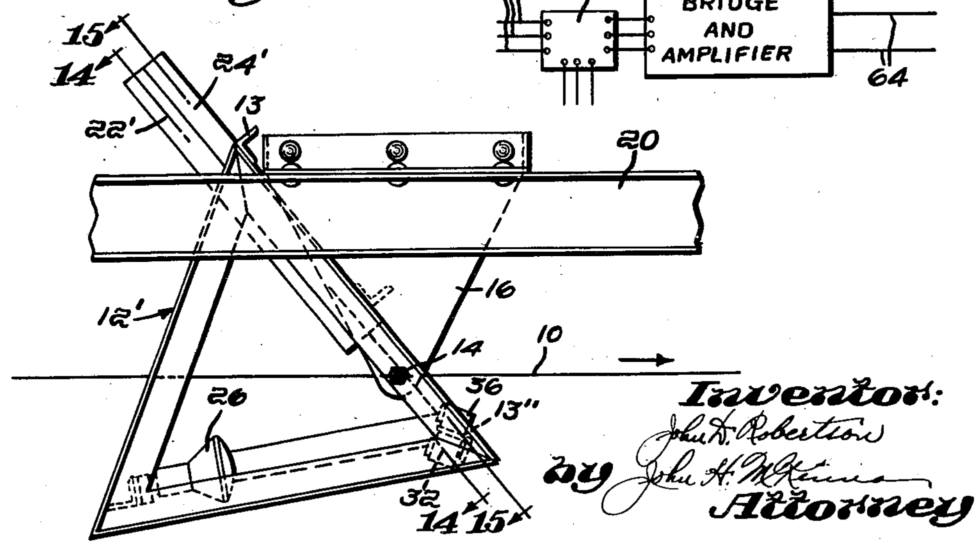
Fig. 12 is an end view of scanning and detecting apparatus for detecting bow of the transverse elements of a travelling web.
Figure 13:
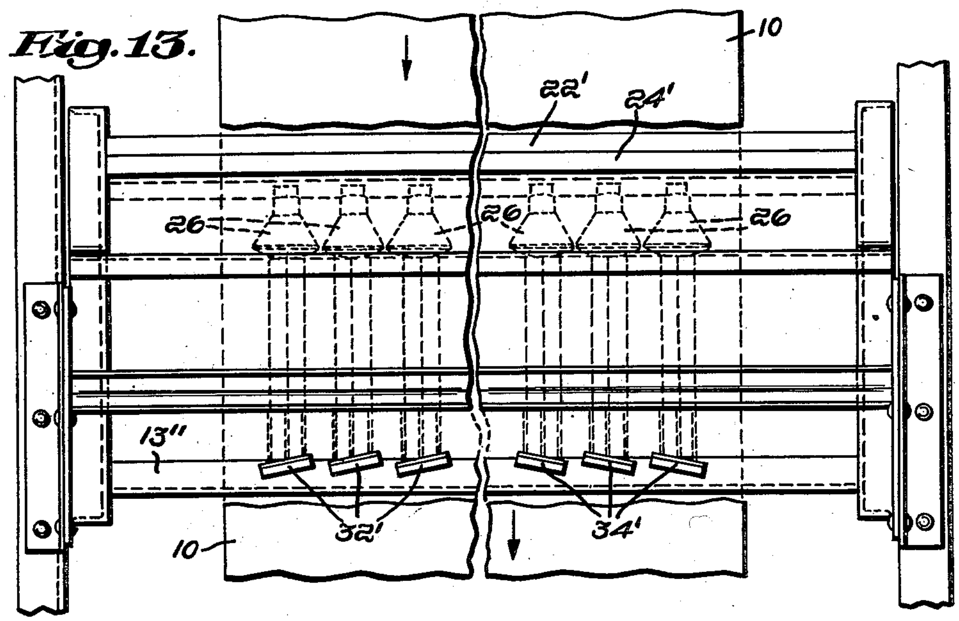
Fig. 13 is a top plan view of the apparatus of Fig. 12.

The scanning apparatus of Figs. 1–3 is designed to detect skew of the transverse elements 48 of a web 10, and Fig. 10 is a diagrammatic representation of the scanning apparatus associated with a known type of skew correcting mechanism which automatically responds to correct any detected skew and which is described in detail in Patent No. 2,343,328, granted March 7, 1944, to the present applicant jointly with Joseph L. Dube. In Fig. 10, the web 10 passes vertically downward to the weft straightening roller 52 which is mounted in the frame 54, pivoted at 56. The web makes approximately a right angular turn around roller 52 on a course leading in a generally horizontal plane to a tenter frame or other processing mechanism. The scanning apparatus ordinarily will be located as close as practicable to the skew correcting roller 52 so that the scanning apparatus will detect a skew, if present, shortly after the web has been acted upon by the weft straightening or skew correcting mechanism, the latter responding to a detected skew to effect a correction in that portion of the web which is advancing to the scanning apparatus. If the skew is in one direction, roller 52 will be moved about its pivot 56 in the proper direction to lengthen the path of travel of the edge at which the ends of the transverse elements are in advance of the other ends of the same transverse elements. If the skew is in the other direction, roller 52 will be moved in direction about its pivot 56 to lengthen the path of travel of the other edge of the web.

The roller 52 is moved in one or the other direction in response to operation of the reversible motor 60 in one direction or the other, and the motor 60 operates in response to differences of light intensity at the light sensitive tubes or cells 28, 30 in the boxes 22, 24. The tubes or cells 28, 30 are connected to any suitable type of bridge and amplifier 62 (Fig. 11) which may be supplied with power through conductors 64 from any suitable source. The bridge and amplifier 62 delivers current to the reversing motor starter 66 which controls the reversing motor 60 through the conductors 68. Motor 60 has drive connection at 70 with the roller carrying frame 54, whereby the frame is moved in one direction or the other about its pivot 56 in response to operation of motor 60. If the tube or cell 28 is receiving more light than tube 30, motor 60 will respond to move the far end of roller 52 to the left about pivot 56 in Fig. 10, thereby to lengthen the path of travel of the far edge of the web in Fig. 10. If tube or cell 30 is receiving more light than tube 28, motor 60 will respond to move the near end of roller 52 to the left in Fig. 10, thereby to lengthen the path of travel of the near edge of the web.

Figure 14:
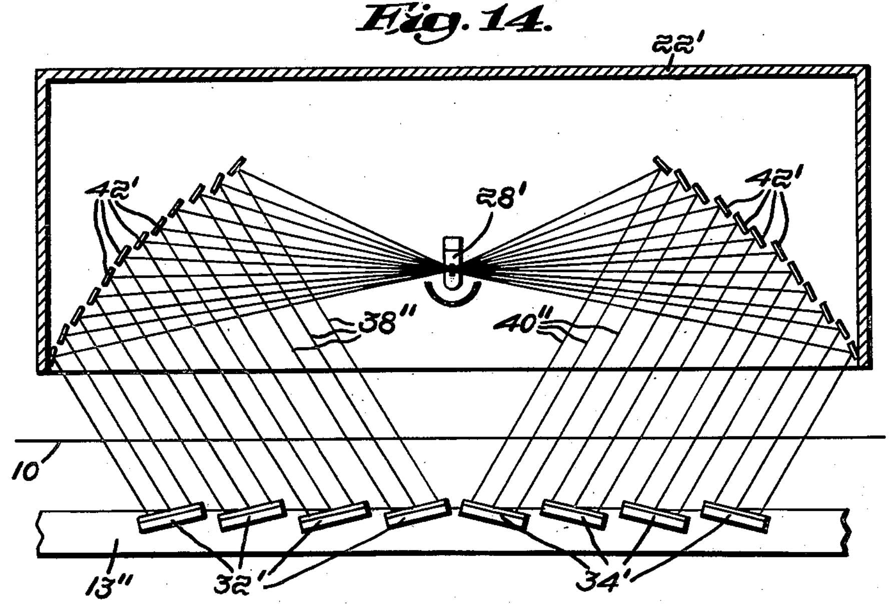
Fig. 14 is a cross-sectional view through one of the ray receiving boxes, approximately on line 14—14 of Fig. 12.

Figs. 12–16 illustrate the invention as embodied in apparatus for detecting and correcting bow of the transverse elements 48 of a woven web 10. Figs. 12–16 show two boxes 22′, 24′ comparable to the previously described boxes 22, 24. Boxes 22′, 24′ however, are arranged flatwise against each other throughout substantially their entire extents, they being mounted on a pivoted frame between frame sections 12′ in a manner comparable to the mounting of boxes 22, 24. For bow detection, however, an equal number of mirrors 32′ and 34′ are mounted on supporting bar 13′′ for directing rays from lamps 26 through a web 10 with the mirrors 32′ positioned at one side of the central regions of the web for directing rays 38′′ through the web and into box 22′ in a rearwardly inclined and laterally inclined direction comparable to the direction of the rays 38′ in the Figs. 1–3 form, and with the mirrors 34′ positioned at the other side of the central region of the web for directing rays 40′′ through the web and into box 22′ in a rearwardly inclined and laterally inclined direction comparable to the direction of the rays 40′ in the Figs. 1–3 form. Mirrors 42′ are arranged in box 22′ for intercepting the rays 38′′ and 40′′ passing through the web into box 22′ and for converging them on a light sensitive tube or cell 28′ in box 22′, as best seen in Fig. 14.

Another equal number of mirrors 32′ and 34′ are mounted on the supporting bar 13′′ for directing rays from lamps 26 through the web 10 into box 24′. These mirrors 34′ are positioned at that side of the central region of the web corresponding to the positions of mirrors 32′ for box 22′, they being set for directing rays 40′′ through the web and into box 24′ in a rearwardly inclined and laterally inclined direction comparable to the direction of the rays 40′ in the Figs. 1–3 form. The mirrors 32′ for box 24′ are positioned at that side of the central region of the web corresponding to the positions of mirrors 34′ for box 22′, they being set for directing rays 38′′ through the web and into box 24′ in a rearwardly inclined and laterally inclined direction comparable to the direction of the rays 38′ in the Figs. 1–3 form. However, since the rays 40′′ and 38′′ entering box 24′ are directed generally toward each other, two sets of mirrors are provided in box 24′. Mirrors 72 of one set are positioned to intercept the rays 40′′ and 38′′ as they enter box 24′ and to re-direct the intercepted rays outwardly and upwardly within box 24′. Mirrors 44′ of the other set correspond to the mirrors 42′ in box 22′ and are positioned for intercepting the re-directed rays from mirrors 72 and for converging them on the light sensitive bulb or cell 30′ in box 24′.

The scanning and bow detecting action of the apparatus of Figs. 12–16 is generally similar to the scanning and skew detecting action of the apparatus of Figs. 1–11, excepting that a bowed condition of the transverse elements causes the web to act as a shutter reducing the passage of both rays 38′′ and rays 40′′ into one box while increasing the passage of both rays 38′′ and rays 40′′ into the other box, on the same principle explained in connection with Figs. 4–9.

Figure 16:
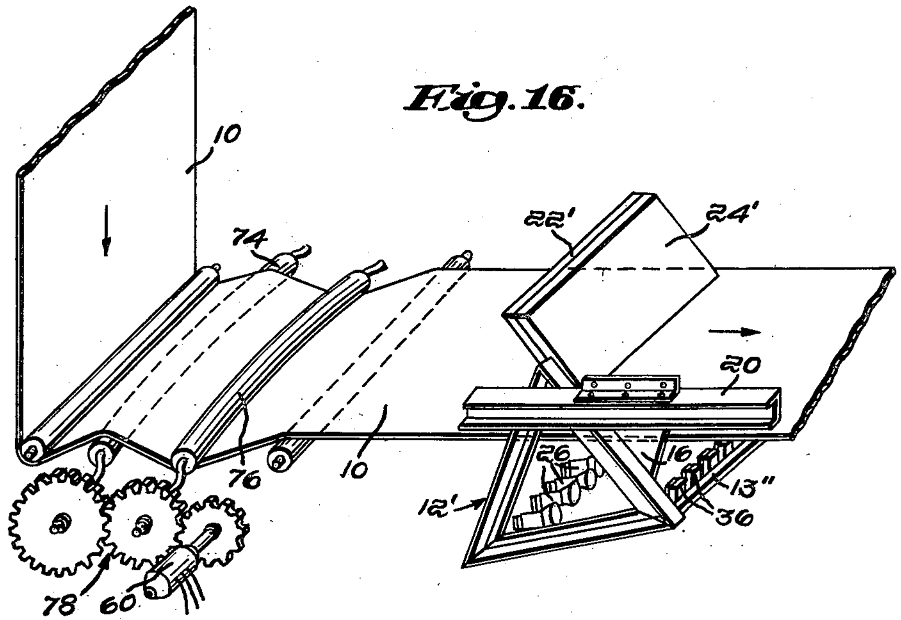
Fig. 16 is a diagrammatic perspective view illustrating the scanning and detecting apparatus of Figs. 12–15 associated with bow-correcting mechanism.

However, the tubes 28', 30' of boxes 22', 24' will be connected for control of any suitable bow correcting mechanism, such as is shown in Fig. 16, wherein the web 10 passes under and over two curved rolls 74, 76, respectively, which are geared together at 78 for rotation in opposite directions. This type of bow correcting mechanism is described in greater detail in my Patent No. 2,496,312, granted February 7, 1950. A reversible motor 60, responsive to the light sensitive tubes 28', 30', as described in connection with Figs. 10 and 11, rotates rolls 74, 76 to lengthen the path of travel of the central region of the web relative to the edges thereof if the bow is such that the ends of the transverse elements are lagging behind the central regions thereof, or to lengthen the paths of travel of the edge portions of the web relative to the central region thereof if the bow is such that the central regions of the transverse elements are lagging behind the ends thereof.

Figure 15:
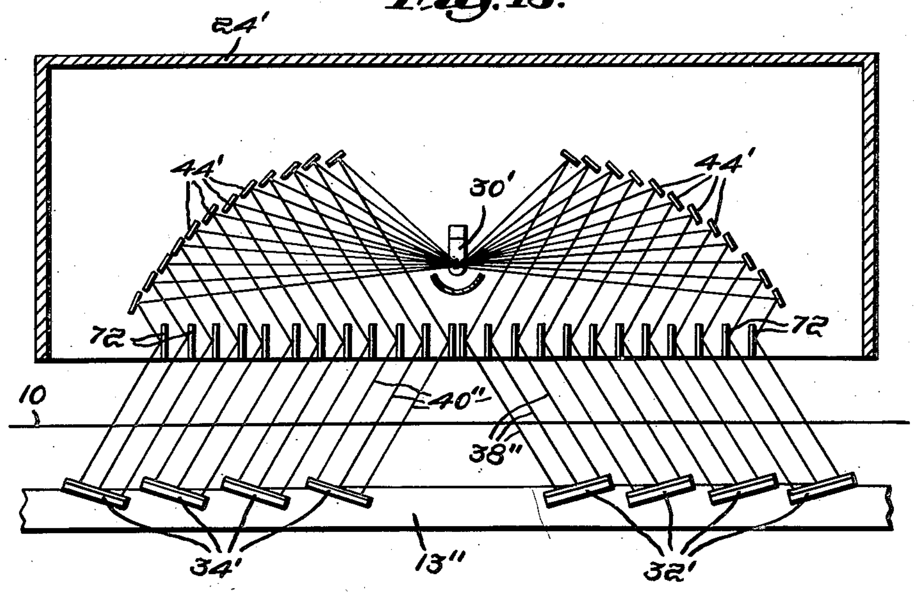
Fig. 15 is a similar view through the other box, approximately on line 15—15 of Fig. 12.

As in the Figs. 1–3 form, the relatively small unscanned central and edge regions of the web 10 in Figs. 14 and 15 have no appreciable effect upon the bow detecting efficiency of the apparatus as disclosed.

It is a feature of importance that the scanning and detecting rays of light directed through the web as herein disclosed, for both skew and bow correction, are directed in a manner to produce an averaging effect across substantially the entire width of the web. Hence, the rays are effective for detection of skews and bows which are more or less regular across the width of the web and are equally effective for detection of irregularly distorted conditions of the filler threads, or comparable transverse elements, as when the filler threads may have wavy or otherwise irregular extents across the web. Also, the mentioned averaging effect of the rays entering each box after passing through substantially the entire width of the web which is being scanned assures accurate scanning when substantial differences in warp tension may exist at different locations across the width of the web. For example, when skew-correcting mechanism is operating to straighten skewed filler threads, one selvage region of the web is subjected to increased tension while the tension of the opposite selvage region is diminished. The resulting substantial difference in warp tension naturally tends to effect a spreading apart of the filler threads at the selvage region of increased warp tension and a crowding together of the filler threads at the selvage region of reduced warp tension. When the prior transmitted light scanning devices have been subjected to such an unequal warp-tension condition, false signals frequently have resulted because the light-sensitive cells receive transmitted rays from only one selvage region and not from the other. Hence, even after the filler threads may have been brought into perpendicularity with the warp threads, continued substantial differences in warp tension tend to prolong the condition of unequal transmission of light and thus the cells may continue to call for operation of the skew-correcting apparatus, with the result that a skew in one direction frequently is changed to a skew in the opposite direction in response to false signals from the prior transmitted-light scanning devices.

Similarly, the scanning of fabrics having patterns not uniformly distributed on opposite sides of the center-lines of the fabrics cannot be accurately scanned by the prior transmitted-light scanning devices because of the inequalities of light transmission caused by the patterns apart from any inequalities of light-transmission that may be due to skew or bow of the filler threads.

Scanning in accordance with my present invention and disclosure avoids all such inaccurate scanning and false signalling by making each cell responsive to light rays which have passed through the web throughout substantially its entire width, so that conditions affecting the passage of light and due to differences in warp tension or to non-uniformity of distribution of fabric patterns are communicated to each light-responsive cell as an averaged effect for the full width of the web, whereby any differences in light intensity as between the two cells will be substantially entirely due to a skewed or bowed condition of the filler threads, or other transverse elements of the web.

While the invention has been illustrated as embodied in mechanisms wherein the rays of light are directed through web 10 at rearwardly inclined angles relative to the direction of travel of the web, it should be understood that comparable scanning and detecting efficiency may be attained with the direction of travel of the web 10 past the scanning mechanism opposite to the direction indicated in the drawings, assuming that the skew or bow correcting mechanism always will be located for acting on the web at portions thereof which are advancing to the scanning mechanism. Also, the scanning mechanism may be arranged for scanning a web at a vertically travelling region thereof or at a region thereof which is travelling in any inclined plane between vertical and horizontal planes. Similarly, the skew and bow correcting mechanisms may act on the web at regions thereof which are travelling vertically or in any inclined plane between vertical and horizontal planes.

It should be understood that various modifications may be made in the apparatus herein disclosed without departing from the scope of the invention as defined in the claims.

I claim as my invention:

1. Apparatus for controlling the positions of the transverse elements relative to the longitudinal elements of a travelling woven web in which the transverse elements have a normal perpendicular relation to the longitudinal elements, said apparatus comprising, in combination, means for directing light through the web with some of the rays of light directed through the web in one direction throughout a substantial portion of the width of the web and with some of the rays of light directed through the web in a different direction throughout the same said substantial portion of the width of the web, a plurality of light sensitive devices mounted in spaced relation adjacent to the web, means mounted in the paths of and intercepting the rays of light which have passed through the web in said one direction and disposed for converging the intercepted rays on one of said light sensitive devices, means mounted in the paths of and intercepting the rays of light which have passed through the web in said different direction and disposed for converging the intercepted rays on another of said light sensitive devices, said elements of the web when in their said normal perpendicular relationship permitting substantially uniform passage of light throughout said substantial portion of the width of the web whereby the light intensity at each of said light sensitive elements is substantially equal, but any substantial displacement of said transverse elements out of their said normal perpendicular relation to the longitudinal elements providing a shutter effect whereby the rays of light passing through the web and converged on one of the light sensitive elements are substantially reduced relative to the rays of light passing through the web and converged on the other light sensitive element, and means mounted in coacting engagement with the web and responsive to a difference of light intensity at one of said light sensitive elements relative to the other for restoring the displaced transverse elements to their said normal perpendicular relation to the longitudinal elements.

2. Apparatus for controlling the positions of the transverse elements relative to the longitudinal elements of a travelling woven web in which the transverse elements have a normal perpendicular relation to the longitudinal elements, said apparatus comprising, in combination, a pair of receptacles arranged opposite one face of the travelling web and transversely thereof with an opening into each receptacle extending substantially throughout the width of the web and open toward the web, a light sensitive device mounted within each said receptacle, a pivoted support on which said receptacles are fixed with the pivotal axis of the support extending transversely of the web approximately in the plane thereof, whereby the receptacles may be tilted to any of various angular positions relative to the plane of the web, means mounted on said support on that side of the web opposite the location of said receptacles for directing a sheet of rays of light generally in a direction longitudinally of the web with the sheet extending throughout substantially the entire width of the web, means mounted on said support in the paths of the rays of said sheet of rays and disposed and adapted for intercepting said rays and re-directing them through the web in rearwardly inclined directions relative to the direction in which said sheet of rays is directed generally longitudinally of the web, some of said intercepting and re-directing means being disposed for re-directing rays in said rearwardly inclined directions with lateral inclination generally toward one edge of the web, and some of said intercepting and re-directing means being disposed for re-directing rays in said rearwardly inclined directions with lateral inclination generally toward the other edge of the web, the directions of said rays re-directed through the web leading some of said rays passing through the web into one of said receptacles and some into the other one of said receptacles, means in one of said receptacles for intercepting rays entering that receptacle and converging them on said light sensitive device in that receptacle, and means in the other one of said receptacles for intercepting rays entering that receptacle and converging them on said light sensitive device therein.

3. Apparatus for controlling the positions of the transverse elements relative to the longitudinal elements of a travelling woven web in which the transverse elements have a normal perpendicular relation to the longitudinal elements, said apparatus comprising, in combination, a pivotally mounted frame through which the travelling web passes, a series of lamps mounted on said frame and distributed in spaced relation in a transverse row adjacent to one face of the travelling web and arranged and adapted to direct rays of light longitudinally of the web adjacent to said one face thereof, means mounted on said frame in the paths of said rays from the lamps and disposed and adapted for re-directing said rays through the web with substantially one-half of the rays re-directed in one angular direction through the web and substantially another half of the rays re-directed in a different angular direction through the web, a plurality of light sensitive devices mounted in spaced relation on said frame, means mounted on said frame in positions to intercept the re-directed rays which have passed through the web and disposed and adapted for re-directing said rays and converging them on said light sensitive elements, approximately one-half of the rays passing through the web being converged on one of said light sensitive devices and approximately one-half of the rays passing through the web being converged on the other of said light sensitive devices so long as the transverse elements of the web continue in their normal perpendicular relation to the longitudinal elements of the web, and means responsive to a difference of the light intensity at one of said light sensitive elements relative to the other for effecting a change in the existing relationship of the transverse elements of the web relative to the longitudinal elements thereof.

4. Apparatus for controlling the positions of the transverse elements relative to the longitudinal elements of a travelling woven web in which the transverse elements have a normal perpendicular relation to the longitudinal elements, said apparatus comprising, in combination, a pair of relatively narrow boxes disposed transversely of and above the travelling web with a narrow side of each box toward the web and open throughout substantially the width of the web, a pivoted frame supporting said boxes with its pivotal axis extending transversely of the web substantially in the plane thereof, whereby the boxes may be tilted to various angular relations to the plane of the web, a light sensitive device mounted in each said box, a series of lamps mounted on said frame in a transverse row under the web and disposed for directing rays of light generally longitudinally of the web throughout substantially the width of the web, mirrors mounted on said frame and disposed for intercepting rays from the lamps and re-directing the rays through the web at an angle to the plane of the web and with inclination longitudinally of the web such that rays passing through the web enter said boxes, approximately one-half of said mirrors being disposed for re-directing rays through the web at said longitudinally inclined angle with lateral inclination generally toward one edge of the web, and approximately half of said mirrors being disposed for re-directing rays through the web at said longitudinally inclined angle with lateral inclination generally toward the other edge of the web, mirrors mounted in one of the said boxes for intercepting entering rays and converging them on the light sensitive device therein, and mirrors mounted in the other one of said boxes for intercepting entering rays and converging them on the said light sensitive device therein, the rays of light passing through the web and entering said boxes being approximately equal in each box so long as the web elements continue in their normal perpendicular relationship, and becoming unequal when the transverse elements of the web become displaced.

5. Apparatus for controlling the positions of the transverse elements relative to the longitudinal elements of a travelling woven web in which the transverse elements have a normal perpendicular relation to the longitudinal elements, said apparatus comprising, in combination, means for directing light through substantially the entire width of the web with some of the rays directed through a substantial width of the web on one side of its center line in one angular relationship to the plane of the web and with some of the rays directed through the same substantial width of the web in another angular relationship to the plane of the web, a pair of boxes mounted transversely of the web in positions to receive the rays directed through the web, one of said boxes being located relative to said substantial width of the web for receiving only rays passing therethrough in said one angular relationship to the plane of the web and the other one of said boxes being located relative to said substantial width of the web for receiving only rays passing therethrough in said another angular relationship to the plane of the web, a light sensitive device mounted in each said box, mirrors mounted in one of said boxes for converging said rays received therein on the said light sensitive device in said one box, and mirrors mounted in the other one of said boxes for converging said rays received therein on the said light sensitive device in said other one of said boxes.

6. Apparatus for controlling the positions of the transverse elements relative to the longitudinal elements of a travelling woven web in which the transverse elements have a normal perpendicular relation to the longitudinal elements, said apparatus comprising, in combination, means for directing light through substantially the entire width of the web, a pair of boxes mounted transversely of the web in positions to receive the rays directed through the web, some of the rays directed through the web having lateral inclination generally toward one edge of the web and some of the rays directed through the web having lateral inclination generally toward the opposite edge of the web, and there being a substantial width of the web at each side of its center line through which rays of both of said inclinations are directed, said boxes being located so that each box receives substantially an equal number of said rays when the transverse elements of the web are in normal perpendicular relation to the longitudinal elements of the web, a light sensitive device mounted in each said box, mirrors in one of said boxes for converging the light rays received therein on the said light sensitive device in that box, and mirrors in the other one of said boxes for converging rays received therein on the said light sensitive device in said other one of the boxes.

7. Apparatus for detecting and correcting a displaced condition of the transverse elements relative to the longitudinal elements of a travelling web wherein the transverse elements have a normal perpendicular relation to the longitudinal elements, said apparatus comprising, in combination, a support, means mounted on the support for directing rays of light longitudinally of the travelling web throughout substantially the entire width of the web at one side thereof, reflecting means mounted on the support in positions to intercept said rays and re-direct them in directions passing through the web with some of the rays re-directed in one angular direction relative to the plane of the web and with approximately an equal number of the rays re-directed in a different angular direction relative to the plane of the web, reflecting means mounted on the support in positions to intercept a substantial number of the re-directed rays which have passed through the web and disposed and adapted for converging at one point all of the rays intercepted thereby, reflecting means mounted on the support in positions to intercept another substantial number of the re-directed rays which have passed through the web and disposed and adapted for converging at another point all of the rays intercepted thereby, a light sensitive device mounted on said support at each of said points of convergence of light rays, and means responsive to difference of intensity of light at one of said light sensitive devices relative to the other for initiating that change in the relationship of the elements of the web which will tend to equalize the light intensity at the two said light sensitive elements.

8. Apparatus for controlling the positions of the transverse elements relative to the longitudinal elements of a travelling woven web in which the transverse elements have a normal perpendicular relation to the longitudinal elements, said apparatus comprising, in combination, a support, a source of light on the support, means on the support for intercepting rays of light from said light source at one side of the web and for re-directing the intercepted rays through the web with some of the rays re-directed through a substantial portion of the width of the web in one angular direction and with substantially an equal number of the rays re-directed through the same substantial portion of the width of the web in a different angular direction, a plurality of light sensitive devices mounted on said support, means on said support in the paths of the rays of light which have passed through said substantial portion of the web in said one angular direction and disposed for converging said rays on one of said light sensitive devices, means on said support in the paths of the rays of light which have passed through said substantial portion of the web in said different angular direction and disposed for converging said rays on another of said light sensitive devices, the intensity of light converged on the respective light sensitive devices being approximately equal when said transverse elements of the web are in their normal perpendicular relation to the longitudinal elements of the web, and means responsive to difference of intensity of light at one of said light sensitive devices relative to the other for effecting that change in an existing relationship of the elements of the web which will tend to equalize the light intensity at said light sensitive devices.

9. Apparatus for controlling the positions of the transverse elements relative to the longitudinal elements of a travelling woven web in which the transverse elements have a normal perpendicular relation to the longitudinal elements, said apparatus comprising, in combination, means for directing light through substantially the entire width of the web, a pair of boxes mounted tranversely of the web in positions to receive the rays directed through the web, some of the rays directed through the web having lateral inclination generally toward one edge of the web and some of the rays directed through the web having lateral inclination generally toward the opposite edge of the web, and there being a substantial width of the web at each side of its center-line through which rays of both of said inclinations are directed, said boxes and said light directing means being relatively located and arranged so that all of the rays passing through the web at one side of the center-line of the web and with lateral inclination generally toward one edge of the web, and all rays passing through the web at the other side of the center-line of the web and with lateral inclination generally toward the other edge of the web, all enter one of said boxes, a light sensitive device mounted in each said box, mirrors in one of said boxes for converging the light rays received therein on the said light sensitive device in that box, and mirrors in the other one of said boxes for converging rays received therein on the said light sensitive device in said other one of the boxes.

JOHN D. ROBERTSON.

REFERENCES CITED

The following references are of record in the file of this patent:

UNITED STATES PATENTS

| Number | Name | Date |
|---|---|---|
| 2,492,737 | Dunn | Dec. 27, 1949 |